(12) United States Patent
Rigsbee, Jr. et al.

(10) Patent No.: US 7,824,054 B2
(45) Date of Patent: Nov. 2, 2010

(54) FISHING EQUIPMENT LIGHTING ASSEMBLY

(75) Inventors: Alvis Adrian Rigsbee, Jr., Henderson, NC (US); Bryan Keith Gibbs, Timberlake, NC (US)

(73) Assignee: Bryan K. Gibbs, Timberlake, NC (US)

( * ) Notice: Subject to any disclaimer, the term of this patent is extended or adjusted under 35 U.S.C. 154(b) by 138 days.

(21) Appl. No.: 11/616,801

(22) Filed: Dec. 27, 2006

(65) Prior Publication Data

US 2008/0155880 A1   Jul. 3, 2008

(51) Int. Cl.
  *A01K 87/00* (2006.01)
  *F21V 33/00* (2006.01)
(52) U.S. Cl. .................. 362/109; 43/17.5; 362/249.02; 362/577
(58) Field of Classification Search .................. 362/109, 362/119, 565, 577; 43/17.5
See application file for complete search history.

(56) References Cited

U.S. PATENT DOCUMENTS

| | | | |
|---|---|---|---|
| 3,940,868 A * | 3/1976 | Northcutt | 43/17.6 |
| 4,369,486 A | 1/1983 | Pool | |
| 4,617,751 A | 10/1986 | Johansson | |
| 4,775,920 A | 10/1988 | Seibert et al. | |
| 5,179,797 A * | 1/1993 | Edwards et al. | 43/17.5 |
| 6,000,808 A | 12/1999 | Hansen | |
| 6,398,399 B1 * | 6/2002 | Neophytou | 362/576 |
| 6,523,987 B1 | 2/2003 | Lee | |
| 6,546,174 B2 | 4/2003 | Clarkin | |
| 6,546,665 B1 * | 4/2003 | Eldredge et al. | 43/17.5 |
| 6,789,348 B1 * | 9/2004 | Kneller et al. | 43/17.5 |
| 7,213,947 B2 * | 5/2007 | Li et al. | 362/346 |
| 7,347,606 B1 * | 3/2008 | Patten | 362/565 |

\* cited by examiner

*Primary Examiner*—Stephen F Husar
*Assistant Examiner*—James W Cranson
(74) *Attorney, Agent, or Firm*—Olive & Olive P.A.

(57) ABSTRACT

The present invention is directed to a retrofit device for lighting fishing equipment at night for example, to light fishing poles or tackle boxes. More particularly, the present invention relates to lighting of fishing equipment with solid core sidelight fiberoptic cable lit with a LED light source.

6 Claims, 1 Drawing Sheet

FISHING EQUIPMENT LIGHTING ASSEMBLY

BACKGROUND OF THE INVENTION

1. Field of the Invention

The present invention is directed to a retrofit device for lighting fishing equipment at night for example, to light fishing poles or tackle boxes. More particularly, the present invention relates to lighting of fishing equipment with sidelight fiberoptic cable lit with a LED light source.

2. Description of the Related Art

The sport fishing industry has become extremely popular and millions of people around the world participate in recreational and competitive fishing activities. Dawn, dusk and nighttime are the most popular times for fishing and fishermen often find themselves either fishing or dealing with their fishing equipment in darkness or near darkness. Because fishing includes a long pole, hooks and other tackle that can cause injury, it is extremely important that the fisherman be aware of the location and position of the tackle during use.

Night time lighting for fishing has in the past been provided by artificial illumination such as flashlight, lanterns or other self contained portable light sources. While this type of lighting has its uses for rummaging through tackle boxes and the like, it has not entirely been useful for some cases. It is a common practice for the fisherman to lay out the tackle box and other large equipment including extra poles and the like. In addition, the fisherman may prop-up one or more poles in a holder in order to have multiple lines in the water while enabling the fisherman to relax or do other activities. It is important though that even though the equipment is at a distance, that some sort of "eye" can be kept on the equipment, especially to tell if there is a fish on the line of a pole.

According, there are a number of devices that have been developed and marketed which help keep track of individual pieces of tackle by lighting it in a number of ways. Each has some advantages but each also has its own set of drawbacks. In U.S. Pat. No. 4,775,920 to Seibert et al, there is disclosed a fishing pole with an internal lighting system. The pole has a hollow transparent area which is lit by a battery operated light source. In U.S. Pat. No. 6,789,348 to Kneller et al, there is disclosed another hollow fishing pole with and LED light source. Kneller teaches how to light the tip of a fishing pole with use of a glowing tip end. Kneller also discloses some 17 issued patents of earlier approaches to lighting of fishing poles.

Recently, fiberoptic cables have played a role in several inventions for lighting fishing poles. In U.S. Pat. No. 4,369,486 to Pool, there is described a large external battery pack with multiple optical fibers inside a hollow fishing pole adapted to receive the fiber optic or bundle of fiber optic cables. One or more pinpoints of light can be created along the inside of the fishing pole with the device of the invention. In U.S. Pat. No. 6,000,808 to Hansen a fishing pole is described with an internal illumination system. A battery and light are contained in the fishing pole handle a lighting cable is run inside the pole to the tip and side lighting is provided by either a glass element or a fiber optic element which is "lightly abraded to allow radial escape of the transmitted light". In U.S. Pat. No. 6,546,665 to Eldredge et al, there is described use of a fiber optic bundle of fibers that includes an LED light source to illuminate the bundle. Again, this is an integral design with the light and battery in the fishing pole handle and the fiber optic bundle running up the inside of the fishing pole.

While the above devices have their utility in providing a way to light an individual fishing pole they require a specially adapted fishing pole with the pole portion being made of specific clear plastic materials. Generally, fishermen own a number of fishing poles and other fishing tackle and the like. These poles, unless lost, tend to last a lifetime. Further, fishing poles tend to have the pole section made of very specific materials such as carbon fiber, that aid in the fishing process especially when reeling in a caught fish. Fishing poles with internal lighting devices not only would require the replacement of all the fisherman's fishing poles which these days have become very expensive, it would require making them in such a way that they no longer provided the optimum fishing characteristics desired by fishermen. This problem was at least initially addressed in U.S. Pat. No. 6,523,987 to Lee. Lee discloses an external fishing pole retrofit kit comprising a power source with a light bulb. An end lit fiber optic cable is attached to the light bulb and the opposite end of the fiber optic cable is mounted with a plastic bulb. The device further has clips attached to it which allow the light source and well as the fiber optic cable to be attached from the handle to the tip of a fishing pole. Since this fiber optic cable only glows at the tip with the aid of the added bulb at the tip, the Lee device only provides, in use, a fishing pole with a glowing tip. While useful to enable the fisherman to detect fish nibbles while a pole is in use, it is not very useful for being able to find or see the entire pole for example, during use or to find the pole. While it is also only useful for attaching to fishing poles and not very useful as described for attaching to other fishing equipment.

Over the last few years, fiber optic cables which have both axial and longitudinally lighting capabilities have been introduced. These so-called side-emitting fiber optic cables have the advantage of side lighting but deliver less light to the end of the cable. They are available in a wide array of types which require various lumen inputs to fully light the cable. One example of such cable is in U.S. Pat. No. 6,546,174 to Clarkin. This cable is useful primarily for lengths over 25 feed but does offer side light capabilities at shorter lengths.

While it is clear that lighted fishing poles and equipment are desirable as evidenced by the extremely crowded art of lighting fishing poles, it is clear that no one has yet introduced a lighting system or discovered or combined the elements of a lighting system which overcomes the limitations and meets the needs disclosed above with the known fishing pole lighting systems.

SUMMARY OF THE INVENTION

The present invention relates to a device for overcoming may of the limitations and problems of the fishing equipment lighting devices that currently exist in meeting the needs of the sport fisherman. It has been discovered that combining an LED light source that is properly balanced in light output (lumens) with a solid core side lit fiber optic cable instead of the end lit fiber optic cable previously used on fishing equipment provides novel and unobvious benefits to the recreational fisher and their fishing equipment.

In one embodiment of the invention there is provided, a fishing equipment lighting assembly comprising:

a. a portable power source;

b. a fishing equipment attachment means for removably attaching the portable power source to a selected piece of fishing equipment;

c. an LED light source attached to the power source; and d. a solid core side lit fiber optic cable in light communication with the LED light source, wherein the LED light source is selected such that it has a lumen output sufficient to cause a perceptible glow of the side lit fiber optic cable and insufficient to cause retinal image retention.

The present invention relates to mounting the device of the invention on fishing equipment such as a fishing pole. Accordingly, the present invention also comprises a method of lighting a piece of fishing equipment comprising:

a) providing a fishing equipment lighting assembly comprising:
  i a portable power source;
  ii a fishing equipment attachment means for removably attaching the portable power source to a selected piece of fishing equipment;
  iii an LED light source attached to the power source; and
  iv a solid core side lit fiber optic cable in light communication with the LED light source, wherein the LED light source is selected such that it has a lumen output sufficient to cause a perceptible glow of the side lit fiber optic cable and insufficient to cause retinal image retention;
b) attaching the fishing attachment means to the piece of fishing equipment;
c) wrapping the fiber optic cable around the piece of fishing equipment; and
d) engaging the light source to light the side lit fiber optic cable.

These and other aspects and objects of the present invention will be clear when taken in view of the detailed specification and disclosure in conjunction with the appended figure.

BRIEF DESCRIPTION OF THE DRAWINGS

An embodiment of the present invention is described herein and associated with the drawings in which like features are indicated with like reference numbers.

DETAILED DESCRIPTION OF THE INVENTION

Figure 1:
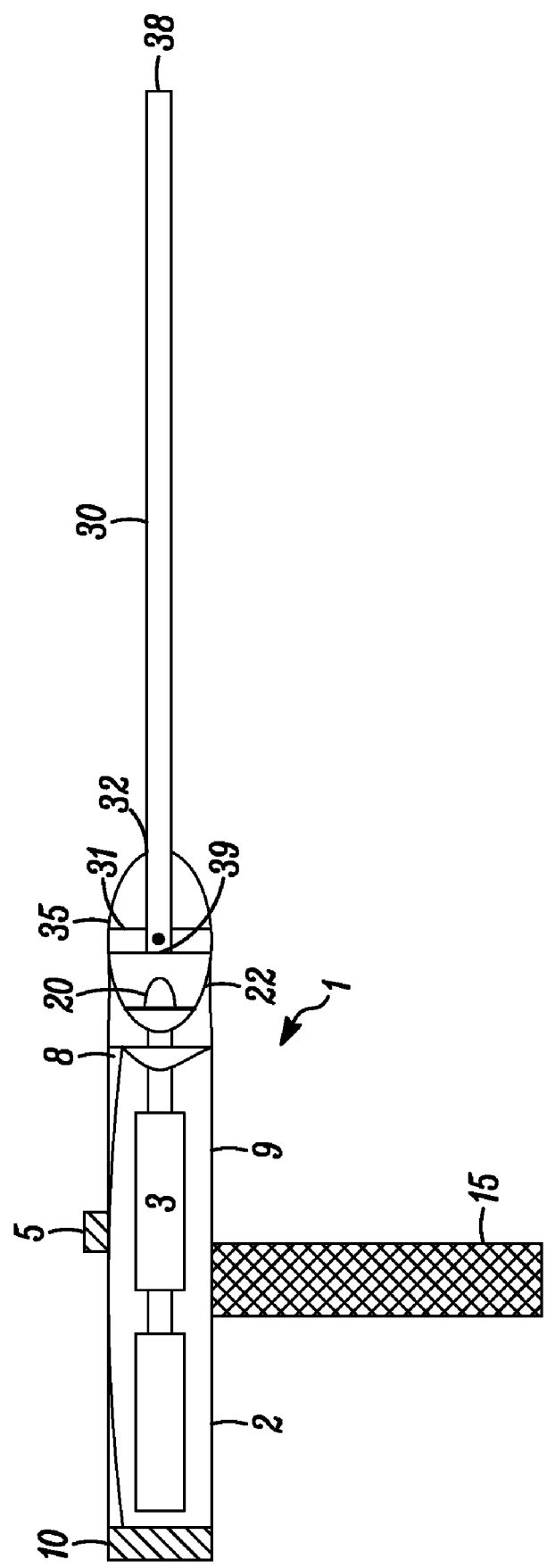
FIG. 1 is a partial cut-out side view of an embodiment of the present invention.

The general description of the fishing equipment lighting assembly of the invention and how to use the device are stated in the Brief Summary above. This detailed description defines the meaning of the terms used herein and specifically describes embodiments in order for those skilled in the art to practice the invention. The above interests in lighting fishing equipment for use in darkened conditions so that one can see where the entire piece of equipment is, can readily be seen from the disclosure which follows, and are met by the present invention. This detailed description defines the meaning of the terms used herein and specifically describes embodiments in order for those skilled in the art to practice the invention.

As used herein "fishing equipment" means larger pieces of tackle such as fishing poles, tackle boxes, hand nets and the like. These pieces of fishing equipment will all benefit from attaching a glowing piece of fiber optic cable so that in addition to knowing where the piece of equipment is one will be able to detect the shape and position of the equipment to help prevent injuries and accidentally hitting other objects or people with the equipment.

As used herein "lighting assembly" means the combination of portable LED lighting source power by a portable power with an attached solid core side lit fiber optic cable as described more fully herein.

As used herein a "portable power source" refers to battery power source, either disposable or rechargeable, that provides enough voltage to power an LED lamp bulb. So, for example, it could be a flashlight type case with 2 double A batteries and an on-off switch attached to the LED bulb. In one embodiment the batteries are rechargeable and in yet another embodiment there is a solar collector panel on the power source to recharge the rechargeable batteries. In another embodiment, the power output of the power source is adjustable which would adjust the lumen output of the LED bulb selected. "Engaging the light source" refers to turning on the power source to light the LED light bulb.

As used herein "attachment means" and "removably attaching" refers to the power source having a means to be stably attached to the piece of fishing equipment that is desired to be lit. In one embodiment, the portable power source has a Velcro type hook and loop strap to attach to a fishing pole. In another embodiment, there is a clip which could attach to a carrying handle of a tackle box, the frame portion of hand held fishing net or to the handle of a fishing pole. Other embodiments of an attachment means which is removable after use would be clear from this disclosure.

As used herein "LED light source" refers to the myriad of LED light bulbs available in today's market. They are available in a wide range of lumen outputs, have extraordinarily long life (50,000 to 100,000 hours) and in use, drain very little wattage so may be used during an extended fishing period without the need to replace batteries. Lumen output is very important as described elsewhere relating to the fiber optic cable. High output LED lights have a lumen output from about 40 lumens to 80 or more lumens see, for example, currently available Luxeon brand LED bulbs. Other less efficient LED bulbs are available and can be used to match with appropriate fiber optic cables as described. The brightness of the glowing fiber optic cable is directly related to the LED luminal output. As taught above by adding a variable power source or by adding an adjustable electrical resistance one could adjust the brightness observed during use of the present invention.

As used herein "side lit fiber optic cables" refers to those style of fiber optic cables that produce a glow along the entire length of the cable as opposed to the end lit fiber optic cables that were originally developed. There are two types of side lit cables. The multi-strand type cables and the solid core type cables. As used herein the side-glow filament intended for the invention are solid core side glow fiber optic cables which produce a more even glow and tend to be of smaller diameter and thus more flexible than other types of side glow cables. The actual diameter of the cable used in the invention is from about 1 millimeter to about 1 inch. In one embodiment, they are from about 1 millimeter to about 5 millimeters. The selected fiber optic cable with then be flexible enough to wrap around a fishing pole or a tackle box or a hand held fishing net or the like. Accordingly, the length should be sufficient to meet the need of the particular use, e.g. as long as a fishing pole, long enough to wrap around a tackle box and the like. In one embodiment the fiber optic cable is between about 1 inch and about 75 inches long when used in the present invention. In another embodiment the cable is from about 6 inches to about 36 inches in length.

Depending on the type of side glow cable more or less lumens will have to be used to get a perceptible light output from the fiber optic cable. That is a simple matter of either consulting the manufacture or simple trial and error to obtain the best match. In matching the LED to the cable though an additional challenge exists in matching the LED to the cable in terms of lumens. If the side glow cable is too bright, then looking at it at night could cause a latent retinal image to remain making it difficult to see until the latent image fades from ones vision. This could be dangerous if not just inconvenient. Accordingly, one assembling the device of the invention will need to avoid too high a LED lumen output when matching the LED to the fiber optic cable. Many of the solid core side lit fiber optic cables require a higher input of lumens and accordingly in one embodiment an LED of between 40 and 80 lumens output would be selected. One skilled in the art informed about the need for a maximum lumen output could easily test when selecting the appropriate LED for the selected fiber optic cable based on the teachings herein. Where the LED is too bright for a given cable the ends of the fiber optic cable can be "scuffed" thus allowing less light in from the LED bulb and achieving the same result and choosing a bulb that produces less luminal output.

As used herein "light communication" refers to the fiber optic cable being positioned such that when the LED is lit, the luminal output reaches the end of the fiber optic cable positioned next to the LED. While side lit solid core fiber optic cables do not glow at the opposite end as much as end glow fiber optic cables, the side glow do still glow at the tip. In one embodiment of the invention, an optional plastic tip could be placed on the end of the fiber optic cable opposite the end placed near the LED, thus creating a glowing tip end as taught previously and is well within the skill in the art.

Now referring to the drawing, FIG. 1 is a horizontal perspective with cut-outs of an embodiment of the invention. A fishing equipment lighting assembly 1 is depicted in FIG. 1 showing the construction of a particular embodiment. A portable power source 2 is shown as a double battery 3 device. The source 2 has on off switch 5 which can vary the battery 3 output thus creating an adjustable light output and electrical wiring 8 which connects the two batteries 3 in parallel. The batteries 3 are not visible with the actual present embodiment but are depicted as visible. In reality, they are inside battery casing 9 which stores the batteries 3 and also provides a water tight or water resistant environment for the electrical wiring 8 and batteries 3.

Battery casing 9 also has a battery cover 10 which can be removed and replaced when adding or changing the batteries 3. In order to make the power source 2 more water resistant one can optionally include an appropriate cover seal such as an O ring or the like for the battery cover 10. The battery casing 9 also depicts a fishing equipment mounting means 15 which is designed to be used to attach the power source removably to a piece of fishing equipment. In this embodiment, the fishing equipment attachment means 15 is a two sided piece of hook and loop fastener which can be wrapped around, for example, a fishing pole handle to attach the assembly 1 power source 2 to the fishing pole for use.

The electrical wiring 8 connects the power from the batteries 3 to an LED bulb 20. The bulb 20 in this embodiment is a 40 lumen LED bulb. Surrounding the LED bulb 20 is light reflector 22 which acts to concentrate the light from LED bulb 20 towards the side lit fiber optic cable 30.

Side glow fiber optic cable 30 is shown as relatively short compared to the length of power source 2 in this embodiment. This might be useful for small fishing equipment but one skilled in the art will realize that the length of the fiber optic cable 30 can be modified to what ever length is necessary or desired for the particular piece of fishing equipment being lit. For example, fiber optic cable 30 is inserted into bulb cover 35 through cable hole 32. The cable 30 is inserted into cable positioner 31 which holds proximal cable end 39 in place over bulb 20 so that when bulb 20 is lit the cable 30 will glow. Fiber optic cable 30 also has distal end 38. Since this is a side glow and not end glow cable, the glow at distal end 38 will not be that great, however, as explained elsewhere an optional plastic knob could be added at this position to produce a glowing knob, although one skilled in the are would realize it would not glow anywhere as bright as when the prior art end glow cables where used.

In using the device of the invention for example, attaching the device to a fishing pole, the following procedure could be used for the embodiment shown in FIG. 1. The power source 2 is taken and the hook and loop strap 15 wrapped around the handle of a fishing pole. Next the cable 30 is wrapped around the pole portion of a fishing pole as frequently as necessary to avoid the fishing line and to not stick out the end of the fishing pole. Additional clips, hook and loop fasteners and the like can optionally be used to hold the fiber optic cable 30 in place as necessary. For use in lighting other fishing equipment a similar procedure could be used. For hand held fishing net the power source 30 is attached to the net handle and the fiber optic cable is then looped through the netting and around the fishing net frame. One skilled in the art could then imagine other fishing equipment so lit with the device of the invention.

The advantages of the present invention, as well as certain modifications of the disclosed embodiments, will be readily apparent to those skilled in the art. Since changes may be made in the foregoing device without departing from the scope of the invention herein, it is intended that all matter in the above invention embodiments and provided in the drawings shall be considered illustrative only and not considered limiting.

What is claimed is:

1. A fishing equipment lighting assembly comprising:
   a) a portable power source;
   b) a fishing equipment attachment means for removably attaching the portable power source to a selected piece of fishing equipment;
   c) an LED light source attached to the power source; and
   d) a solid core side-lit fiber optic cable in light communication with the LED light source,
   wherein the LED light source is selected such that it has a lumen output sufficient to cause a perceptible glow of the side-lit fiber optic cable and insufficient to cause retinal image retention.

2. A detachable fishing equipment lighting assembly according to claim 1 wherein the LED lumen output is between about 40 and about 80 lumens.

3. A detachable fishing equipment lighting assembly according to claim 1 wherein the LED lumen output is adjustable.

4. A detachable fishing equipment lighting assembly according to claim 1 wherein the means for attaching is designed to attach to a fishing pole.

5. A detachable fishing equipment lighting assembly according to claim 1 wherein the means for attaching is designed to attach to a tackle box.

6. A method of lighting a piece of fishing equipment Comprising:
   a) providing a fishing equipment lighting assembly comprising:
      i) a portable power source;
      ii) a fishing equipment attachment means for removably attaching the portable power source to a selected piece of fishing equipment;
      iii) an LED light source attached to the power source; and
      iv) a solid core side-lit fiber optic cable in light communication with the LED light source, wherein the LED light source is selected such that it has a lumen output sufficient to cause a perceptible glow of the side-lit fiber optic cable and insufficient to cause retinal image retention;

b) attaching the fishing attachment means to the piece of fishing equipment;

c) wrapping the fiber optic cable around the piece of fishing equipment; and d) engaging the light source to light the side-lit fiber optic cable.

* * * * *